(12) United States Patent
Buescher et al.

(10) Patent No.: US 6,786,231 B2
(45) Date of Patent: Sep. 7, 2004

(54) FLUID FLOW REGULATOR WITH RESTRICTOR PIN

(75) Inventors: Thomas P. Buescher, St. Louis, MO (US); Timothy E. Reitz, St. Louis, MO (US)

(73) Assignee: Emerson Electric Co.

( * ) Notice: Subject to any disclaimer, the term of this patent is extended or adjusted under 35 U.S.C. 154(b) by 7 days.

(21) Appl. No.: 10/061,112

(22) Filed: Feb. 1, 2002

(65) Prior Publication Data

US 2003/0145891 A1 Aug. 7, 2003

(51) Int. Cl.⁷ .................... F16K 31/385; G05D 16/16
(52) U.S. Cl. .............. 137/491; 137/489.5; 137/505.15; 251/28; 251/61.3; 251/122
(58) Field of Search .............. 137/505, 505.14, 137/505.15, 505.41, 505.42, 489, 489.5, 491, 492.5, 613; 251/122, 61, 61.3, 61.2, 28, 120

(56) References Cited

U.S. PATENT DOCUMENTS

| | | | | | |
|---|---|---|---|---|---|
| 2,288,642 A | * | 7/1942 | Powell | ....................... | 137/510 |
| 2,630,140 A | * | 3/1953 | Taylor, Jr. | .................. | 251/61.3 |
| 2,922,431 A | * | 1/1960 | Jensen | .................... | 137/115.11 |
| 3,603,214 A | * | 9/1971 | Murrell | .................. | 137/505.41 |
| 3,730,773 A | * | 5/1973 | Graber | ................... | 137/505.41 |
| 3,911,947 A | * | 10/1975 | Boxall | .................... | 137/505.14 |
| 4,044,794 A | * | 8/1977 | Matthews | .................... | 137/613 |
| 4,254,796 A | * | 3/1981 | Kelly | .......................... | 137/489 |
| 4,651,778 A | | 3/1987 | Pernat et al. | | |
| 5,238,219 A | * | 8/1993 | Noelke et al. | .............. | 251/122 |
| 5,435,343 A | * | 7/1995 | Buezis | ....................... | 137/489 |
| 5,967,167 A | * | 10/1999 | Johnson | ....................... | 137/14 |
| 5,988,204 A | * | 11/1999 | Reinhardt et al. | ..... | 137/505.41 |
| 6,019,121 A | * | 2/2000 | Uehara | ........................ | 137/489 |
| 6,170,507 B1 | * | 1/2001 | Dalton et al. | .................. | 137/12 |
| 6,263,908 B1 | * | 7/2001 | Love et al. | .................. | 137/489 |
| 6,283,145 B1 | * | 9/2001 | Fenn | .......................... | 137/489 |

* cited by examiner

Primary Examiner—Ramesh Krishnamurthy
(74) Attorney, Agent, or Firm—Kevin Pumm

(57) ABSTRACT

A fluid flow regulator having a chamber comprising a port opening and a tapered pin disposed within the opening, for controllably restricting the cross-sectional flow area through the port. The tapered pin moves relative to the bore of the port that it is disposed in, under the influence of a pressure responsive diaphragm. A spring biases the pin towards the diaphragm. The diaphragm's movement is unaffected by any misalignment of the diaphragm with respect to the tapered pin and port, and the tapered pin's movement is unaffected by any diaphragm movement not in line with the port.

8 Claims, 1 Drawing Sheet

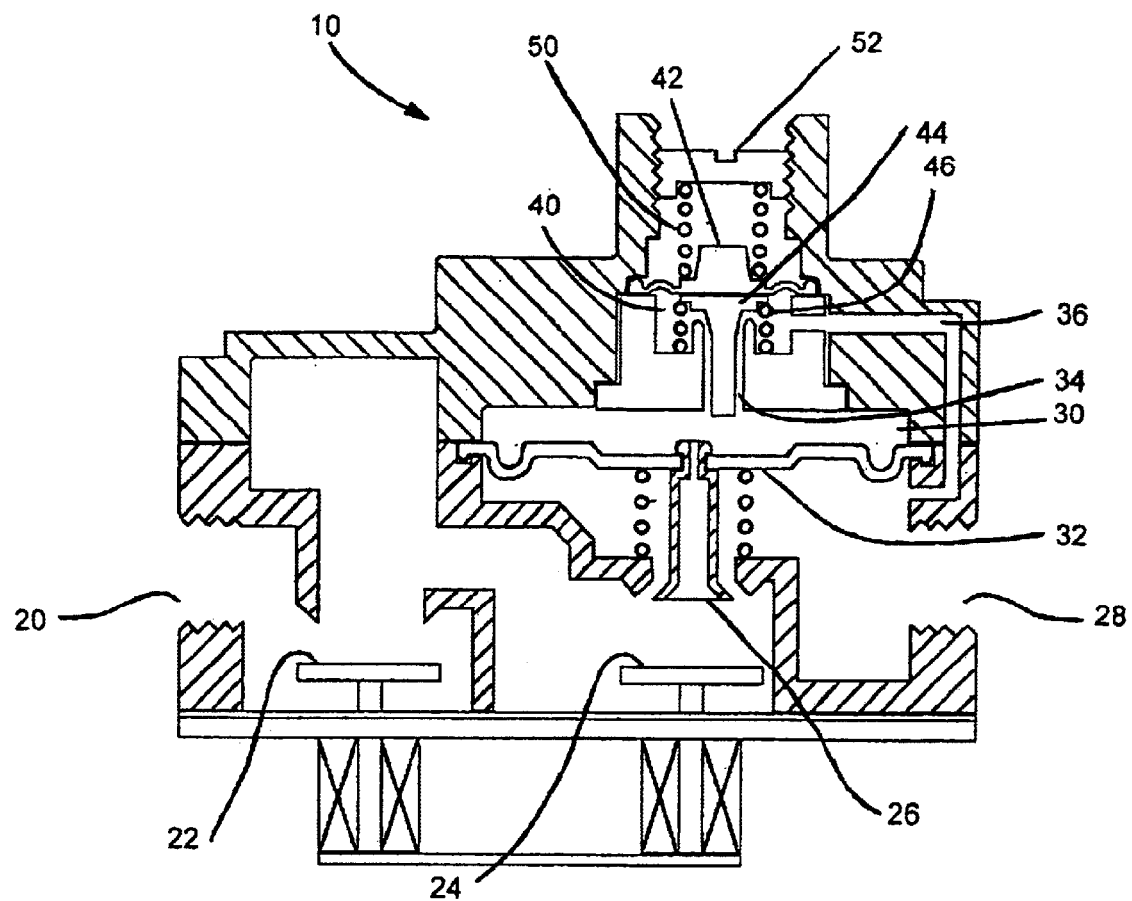

US 6,786,231 B2

FLUID FLOW REGULATOR WITH RESTRICTOR PIN

FIELD OF THE INVENTION

This invention relates to a fluid flow regulator, and in particular to an adjustable fluid flow regulator having a pressure-responsive diaphragm.

BACKGROUND OF THE INVENTION

Prior art regulators used an orifice positioned under a flexible diaphragm, which moved up and down to provide a means of regulating pressure through the orifice. Such regulators achieved less than desirable stability, due to the cyclic opening and closing of the orifice opening. The regulator disclosed in Pernat et. al., U.S. Pat. No. 4,651,778 attempts to improve stability with a diaphragm having a pin protruding into an orifice opening, for varying the size of the flow area as the diaphragm moves up and down. However, Pernat discloses a pin concentrically assembled within a diaphragm, not within an orifice. Manufacturing tolerances can cause the diaphragm and pin to be misaligned with the orifice, compromising the control of uniform flow area through the orifice. Thus, there is a need for an improved regulator device having a means of reliably controlling the flow area through an orifice opening for regulating pressure.

SUMMARY OF THE INVENTION

The present invention relates to an improved regulator construction that isolates the function of a pressure-responsive diaphragm from the function of a flow-restricting pin in an orifice. The present invention utilizes a tapered pin disposed within an orifice, as opposed to prior regulators having a pin affixed to a diaphragm that is positioned over an orifice. The tapered pin centers itself, and does not encounter any side forces associated with a diaphragm and pin that are misaligned with the orifice. This provides for more precise movement and control of flow area, as well as better sealing against the orifice. The regulator construction of the present invention provides an improved means for reliably controlling the flow area through an orifice opening to achieve a more stable regulation of flow.

The tapered pin construction of the present invention further includes a biasing spring. The biasing spring biases the tapered pin in a direction away from the orifice in which it is disposed, and towards a pressure-responsive diaphragm. The pressure-responsive diaphragm is able to move freely, independent of any lateral movement by the tapered pin. The tapered pin moves relative to the bore of the orifice that it centers itself in, under the influence of the pressure-responsive diaphragm. Thus, the pressure-responsive diaphragm's movement is unaffected by any misalignment of the diaphragm with respect to the tapered pin and orifice, and the tapered pin's movement is unaffected by any diaphragm movement not in line with the bore of the orifice.

BRIEF DESCRIPTION OF THE DRAWINGS

The sole FIGURE is a section view of a gas valve unit incorporating a fluid flow regulator constructed according to the principles of this invention.

DETAILED DESCRIPTION OF THE INVENTION

Without intending any loss of generality, the devices and methods of this invention will be described in conjunction with gas control valves, inasmuch as the invention is considered particularly advantageous when employed in such devices. It will be recognized, however, that the devices and methods of this invention may be applied more generally to various other fluids, both gaseous and liquid, and may be used advantageously to control the flow of such fluids in devices other than those that are described herein.

The sole FIGURE is a cross-sectional view of a gas valve incorporating a fluid flow regulator according to the principles of the present invention, which is generally indicated at 10. The gas valve comprises an inlet 20, an outlet 28, a series of valves 22 and 24, and a poppit 26 for controlling the flow through the gas valve. The gas valve further comprises a servo-regulator chamber 40 having an orifice 34, which leads to a regulator chamber 30 for controlling the poppit 26. The poppit 26 has an orifice that supplies regulator chamber 30 with a control pressure that, when applied against diaphragm 32, displaces poppit 26 towards an open position. A pressure signal from outlet chamber 28 that is applied via passage 36 to servo-regulator diaphragm 42 displaces a tapered pin 44 within orifice 34, which bleeds control pressure away to move the poppit 26 towards a closed position. The position of the poppit 26 can be controlled to regulate flow through the gas valve, by regulating the control pressure applied to diaphragm 32. The control pressure is regulated by controlling the flow area through orifice 34 via displacement of the tapered pin 44, which is displaced by the movement of the servo-regulator diaphragm 42. A spring 46 biases the tapered pin 44 towards the servo-regulator diaphragm 42, while allowing the pin to center itself within the orifice 34. An adjustment screw 52 biases a spring 50 against the servo-regulator diaphragm 42 to achieve a desired level of movement with respect to changes in pressure. Therefore, the servo-regulator diaphragm 42 provides a means of movement responsive to changes in the pressure at the outlet chamber, and the tapered pin 44 provides for a means of regulating pressure through an orifice 34 to control the poppit and pressure at the gas valve outlet.

The improved regulator 10 controls the gas valve outlet pressure by regulating a control pressure, which is achieved by controlling the flow area through orifice 34 via displacement of the tapered pin 44. The cross-sectional area of the orifice 34, or port, is controllably restricted by moving the tapered section of pin 44 within the opening of the port. The pin's tapered section is elongated for finer adjustment of flow area, and also serves to concentrically position the pin within the port when fully displaced against the port opening. The spring 46 biases the tapered pin 44 away from the port, or orifice 34. A diaphragm 42 controllably displaces the tapered pin 44 within the port opening, in response to changes in pressure communicated through the signal port or passage 36. The improved regulator accordingly provides a reliable means for concentrically positioning a flow restrictor pin within an orifice, for more precise control of the flow area through the orifice.

Those skilled in the art will recognize that the inventive fluid flow regulator of this invention may be useful in many applications and for control of different types of fluids, and are especially useful for control of gaseous fuel flow. Inasmuch as many modifications within the spirit of the invention will be apparent to those skilled in the art, the scope of the invention should be determined by reference to the claims appended below and the full scope of equivalents as provided by applicable law.

What is claimed is:

1. An adjustable fluid flow regulator having a regulator chamber comprising:

a first port in communication with a pressure signal;

a second port, through which the cross-sectional opening is controllably restricted to regulate a control pressure based on the pressure signal;

a tapered pin disposed within the second port, for controllably restricting the cross-sectional opening area through the second port;

a diaphragm, which is adjustably moveable relative to changes in pressure, for controllably displacing the tapered pin relative to changes in the pressure signal;

a spring axially located around the second port opening lip for biasing the tapered pin towards the diaphragm and away from closure against the port;

wherein the tapered pin is separate and not attached to the diaphragm; and wherein the control pressure controls a second diaphragm and poppit, which regulate the fluid flow through a valve.

2. The adjustable fluid flow regulator according to claim 1, wherein the tapered pin does not closely fit within the second port and is free to move concentrically within the second port in a manner such that the tapered pin centers itself within the second port.

3. The adjustable fluid flow regulator according to claim 1, wherein the tapered pin is biased by the spring towards the diaphragm in a manner such that the diaphragm moves the tapered pin while allowing the tapered pin to center itself within the orifice.

4. The adjustable fluid flow regulator according to claim 1, wherein the pin comprises a tapered section that serves to concentrically center the pin within the second port while the tapered pin is biased against the diaphragm by the spring.

5. An adjustable fluid flow regulator in combination with a gas valve, the regulator comprising:

a first port in communication with a pressure signal;

a second port, through which the cross-sectional opening is controllably restricted to regulate a control pressure based on the pressure signal;

a tapered pin disposed within the second port, for controllably restricting the cross-sectional opening area through the second port;

a diaphragm, which is adjustably moveable relative to changes in pressure, for controllably displacing the tapered pin relative to changes in the pressure signal;

a spring axially located around the second port opening lip for biasing the tapered pin towards the diaphragm and away from closure against the port:

wherein the tapered pin is separate and not attached to the diaphragm; and wherein the control pressure controls a second diaphragm and poppit, which regulate the fluid flow through a valve.

6. The adjustable fluid flow regulator in combination with a gas valve according to claim 5, wherein the tapered pin does not closely fit within the second port and is free to move concentrically within the second port in a manner such that the tapered pin centers itself within the second port.

7. The adjustable fluid flow regulator according to claim 5, wherein the tapered pin is biased by the spring towards the diaphragm in a manner such that the diaphragm moves the tapered pin while allowing the tapered pin to center itself within the orifice.

8. The adjustable fluid flow regulator according to claim 5, wherein the pin comprises a tapered section that serves to concentrically center the pin within the second port while the tapered pin is biased against the diaphragm by the spring.

* * * * *